United States Patent [19]
Cogswell

[11] 3,742,840
[45] July 3, 1973

[54] ROTARY FORK
[76] Inventor: James M. Cogswell, 326 10th St., Seal Beach, Calif. 90740
[22] Filed: May 3, 1972
[21] Appl. No.: 249,845

[52] U.S. Cl. .................................. 99/421 A, 30/322
[51] Int. Cl..... A47j 37/04, A47j 43/18, A47j 43/28
[58] Field of Search.................. 99/419, 420, 421 A; 30/322, 323

[56] References Cited
UNITED STATES PATENTS

| D171,539 | 2/1954 | Goodsell | 99/421 A X |
|---|---|---|---|
| 2,315,143 | 3/1943 | Thompson | 99/421 A |
| 2,558,365 | 6/1951 | Lehnus | 99/421 A |
| 2,619,896 | 12/1952 | Ross | 99/421 A |
| 2,629,313 | 2/1953 | Norville, Jr. et al. | 99/421 A |
| 2,710,449 | 6/1955 | Crino | 30/322 |
| 2,827,848 | 3/1958 | Alden | 99/421 A |
| 2,841,869 | 7/1958 | Levine | 30/322 |
| 2,974,993 | 3/1961 | Duniven | 99/421 A X |
| 3,552,017 | 1/1971 | Smuts | 30/322 |
| 3,589,009 | 6/1971 | Miscavich et al. | 30/322 |

FOREIGN PATENTS OR APPLICATIONS

| 135,321 | 11/1949 | Australia | 99/421 A |

Primary Examiner—Wayne A. Morse, Jr.
Assistant Examiner—Arthur O. Henderson
Attorney—J. F. McLellan et al.

[57] ABSTRACT

A rotary fork for roasting wieners, marshmallows and the like including a cylindrical barrel adapted to rest upon a suitable support, tubes at the front of the barrel telescopably housing tines, cables connected to the tubes, a gearing system at the rear of the barrel coupled to the cables, and a handle element to operate the gearing system to twist the cables and thereby rotate the tubes without rotating the barrel and without affecting the telescopability of the tines.

4 Claims, 6 Drawing Figures

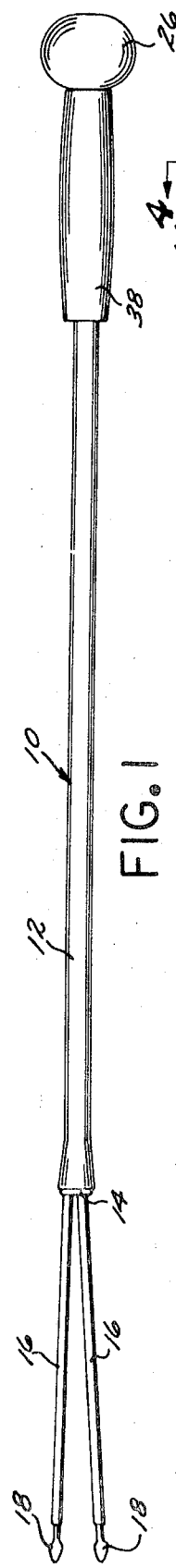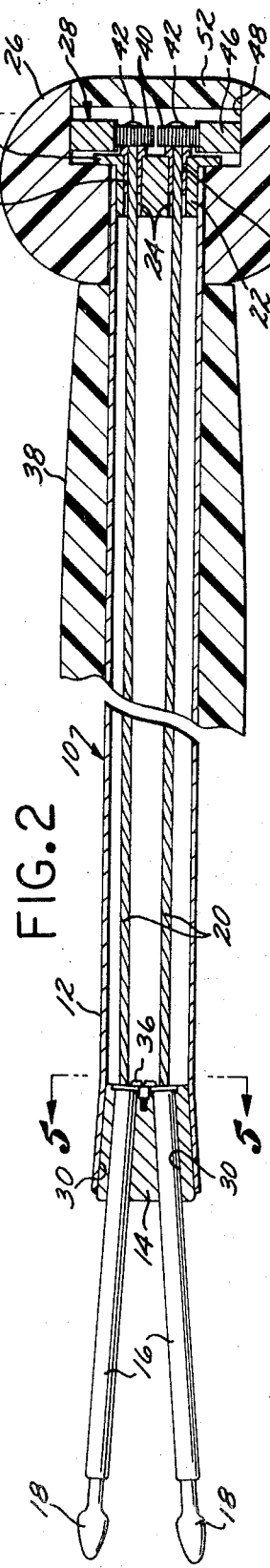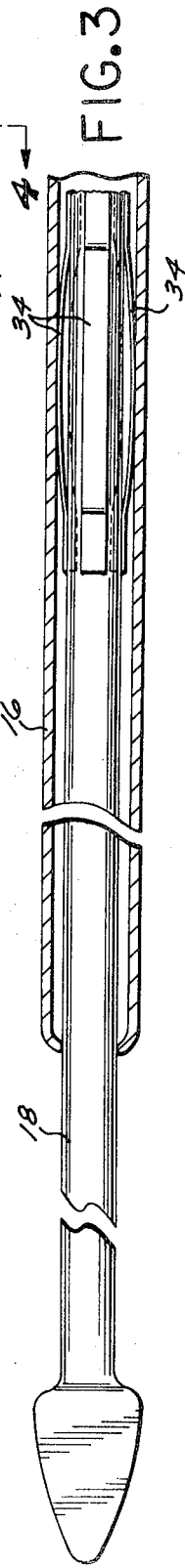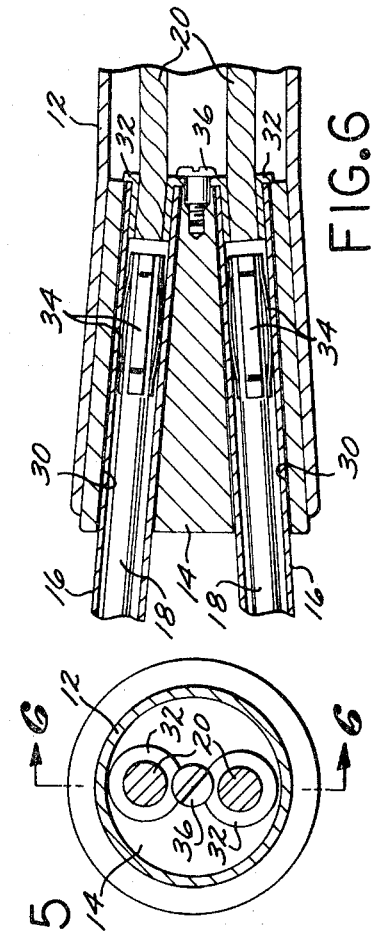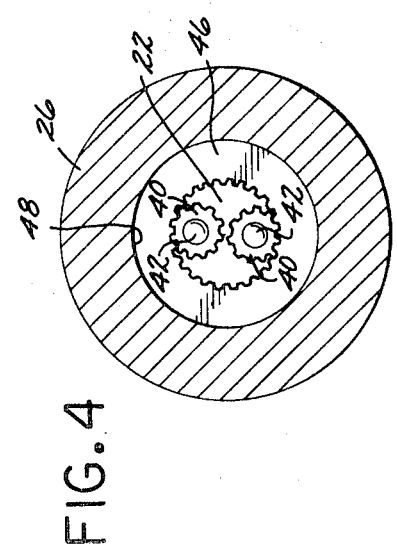

ROTARY FORK

BACKGROUND OF THE INVENTION

1. Field of the Invention

The present invention relates to a rotary fork and more particularly to a rotary fork in which the tines are both rotatable and retractable.

2. Description of the Prior Art

Small children have particular difficulty in holding usual roasting forks steady and at the proper distance from the heat source so that the foodstuffs, such as wieners, marshmallows, or the like, are evenly and uniformly cooked or roasted. Instead, the small child will allow the wiener to dip into the fire and burn. If he attempts to rest the roasting fork upon some stationary support, such as a log, rock, or the like, turning of the roasting fork will cause the fork to move off the support, with the foodstuffs again falling into the fire. Another problem with the usual roasting fork is that small children playfully or unintentionally poke the end of the fork at their playmates, and sometimes cause serious injuries.

SUMMARY

According to the present invention, a rotary roasting fork is provided which includes an elongated outer portion or barrel that can be rested upon a support adjacent the fire, with the barrel provided at its forward end with a mount rotatably carrying a plurality of tubes. These tubes each telescopably mount a tine, and the inner ends of the tubes are coupled to a corresponding plurality of cables which extend rearwardly within the barrel for passage through a rear mount at the rearward end of the barrel, and for coupling to a handle element which is rotatable upon the rearward extremity of the barrel. The coupling means between the cables and the handle element preferably take the form of cooperating gears so that when the handle element is rotated relative to the barrel the tines will be rotated. With this arrangement a child can press the barrel upon a rock or the like next to the fire, hold the barrel with one hand, and rotate the handle element with the other hand to thereby rotate the tines and uniformly cook the foodstuffs without having to be concerned about the fork inadvertently dipping into the fire. Moreover, the telescopable mounting of the tines within the tubes automatically provides for retraction of the tines within the tubes whenever the ends of the tines are playfully or inadvertently pressed against another person. The structure of the tubes and tines preferably includes resilient elements which only offer sufficient frictional constraint to prevent the tines from sliding loosely in and out of the tubes.

Almost all of the mechanism for rotating the tubes, other than the single handle element, are concealed and protected within the barrel. Consequently, nothing is exposed to entangle or soil clothing or the like, nor to provide a danger for the small child.

Other objects and features of the invention will become apparent from consideration of the following description taken in connection with the accompanying drawing.

BRIEF DESCRIPTION OF THE DRAWING

FIG. 1 is a side elevational view of a rotary roasting fork according to the present invention;

FIG. 2 is an enlarged longitudinal cross sectional view of the fork of FIG. 1, the central portion of the fork being cut away for conservation of drawing space;

FIG. 3 is an enlarged longitudinal cross sectional view of one of the tines mounted in its tube, portions of these elements also being cut away for conservation of drawing space;

FIG. 4 is a view taken along the line 4—4 of FIG. 2;

FIG. 5 is an enlarged view taken along the line 5—5 of FIG. 2; and

FIG. 6 is a view taken along the line 6—6 of FIG. 5.

DESCRIPTION OF THE PREFERRED EMBODIMENT

Referring now to the drawings, there is illustrated a rotary roasting fork 10 which comprises, generally, an elongated cylindrical barrel 12; a forward or front mount 14 carried at the forward extremity of the barrel 12; a pair of elongated tubes 16 projecting from and rotatably carried by the mount 14; a pair of tines 18 axially telescopably disposed within the projecting from the pair of tubes 16, respectively; a pair of connecting means in the form of cables 20 coupled to the tubes 16 and extending rearwardly within the barrel 12; a rear mount 22 carried at the rearward extremity of the barrel 12 an including a pair of openings through which the rearward extremities of the cables 20 extend; a handle element or knob 26 rotatable upon the rearward extremity of the barrel 12; and a coupling assembly generally designated by the numeral 28 located adjacent the rearward extremity of the barrel 12 and coupling the cables 20 to the knob 26 in order to effect rotation of the tines 18 upon rotation of the knob 26.

The barrel 12 is outwardly flared at its forward extremity, and the front mount 14 is frusto-conical in configuration to closely fit within this flared extremity. The mount 14 is press fitted within the barrel to securely hold it in position. The particular configuration of the mount 14 allows the tubes 16 to be arranged with their longitudinal axes extending outwardly in divergent relation to the longitudinal axis of the barrel 12, thereby spacing the outer ends of the tines 18 farther apart to provide room for foodstuffs on each of the tines 18.

The tubes 16 are rotatable within complemental bores 30 provided in the mount 14, as best viewed in FIG. 6. A pair of bushings 32 are pressed upon or swaged onto the forward ends of the cables 20, and are also forcibly pressed into the rearward bends of the tubes 16 so that rotation of the cables will rotate the tubes 16 within the bores 30.

Rotation of the tubes 16 is imparted to the tines 18 by means of three resilient members in the form of three elongated snubbers 34 disposed in uniformly spaced relation about the outer surface of each tine 18. The ends of the elongated snubbers 34 are welded or soldered to the associated tine 18, and each snubber includes a central, outwardly bowed section which resiliently bears against the adjacent inner wall of the associated tube 16. The frictional engagement between the snubbers 34 and the tubes 16 is sufficient to cause rotation of the tines 18 with the tubes 16, and is also sufficient to prevent the tines 18 from loosely sliding in and out of the tubes 16. However, the constraint against relative axial movement is not so great that the tines 18 are not retractable when the outer or forward ends of the tines 18 are pressed against something. Consequently, if the child using the fork 10 playfully or inadvertently presses the outer ends of the tines 18 against a playmate, the tines 18 will retract inwardly to the positions illustrated in FIGS. 2 and 6. Preferably the outer ends of the tines 18 are somewhat rounded to further reduce possible injury in such situations.

If desired, a screw 36 may be threaded into a central bore in the inner end of the front mount 14 for engagement of the head of the screw 36 with the flanged ends of the bushings 32 to insure that the bushings 32 will remain in position.

The rearward extremity of the barrel 12 preferably mounts an elongated main handle 38 made of resilient material or the like and providing a convenient grip for holding the fork 10 when the knob 26 is being rotated. The main handle 38 closely grips the barrel 12 and abuts the knob 26 to prevent the knob from being pushed forwardly on the handle and out of desired position.

The coupling assembly 28 includes a pair of gears 40 which include central openings receiving the rearward extremity of the pair of cables 20. A pair of suitable retainer elements 42 are swaged onto the ends of the cables 20 and are forcibly press fitted within the openings in the gears 40 so that when the gears are rotated the cables will also rotate. In addition, a pair of bushings 44 are swaged onto the cables 20 inwardly of the gears 40 and the shank portion of these bushings 44 are rotatably received within the openings 24 in the rear mount 22. The bushings 44 include flanged ends adjacent the gears 40 and bearing against the outer face of the rear mount 22 to constrain the gears 40 against inward movement out of position relative to an internally toothed ring gear 46.

The ring gear 46 is press fitted within a central countersunk cylindrical cavity 48 provided in the rear portion of the knob 26, the side of the ring gear 46 resting against a rear or end flange 50 of the rear mount 22, the flange 50 in turn resting upon the shoulder formed by the difference in diameter between the larger and smaller counter-sunk portions of the cavity 48.

The rearward open end of the cavity 48 is closed by a circular disk 52 which is press fitted within the cavity to conceal and protect the contents of the cavity.

In operation, the barrel 12 of the fork 10 can be rested upon a support (not shown) adjacent the fire to easily and conveniently space the tines 18 and foodstuffs thereon an appropriate distance from the fire. The user then grasps the main handle 38 with one hand and rotates the knob 26 with the other hand to rotate the ring gear 46 and effect simultaneous rotation of the gears 40 attached to the cables 20. The turning of the gears 40 imparts a twisting to the cables 20, which in turn rotates the tubes 16 within the bores 30. Thus, rotation of the tines 18 is provided without accompanying movement of the barrel 12, and without affecting the capability of the tines 18 to retract within the tubes 16. Extension of the retracted tines 18 is easily accomplished by merely grasping the protruding outer end of each tine and pulling it outwardly to its full extension, the outer end of each tube 16 being inwardly formed to engage the snubbers 34 and thereby prevent the tines 18 from completely passing out of the tubes 16.

Various modifications and changes may be made with regard to the foregoing detailed description without departing from the spirit of the invention.

I claim:

1. A rotary roasting fork comprising:
   an elongated barrel;
   a front mount carried at the forward extremity of said barrel;
   a plurality of tubes projecting from and rotatably carried by said front mount;
   a plurality of tines axially telescopably disposed within and projecting from said plurality of tubes, respectively;
   a plurality of cables coupled to said tubes and extending rearwardly within said barrel;
   a rear mount carried at the rearward extremity of said barrel and including openings receiving the rearward extremities of said cables;
   a handle element rotatable upon the rearward extremity of said barrel; and
   coupling means on said rearward extremities of said cables and on said handle element cooperative to rotate said cables upon rotation of said handle element, and means between said tines and tubes whereby said tines are rotatable and whereby said tines are retractable at all times.

2. A rotary roasting fork according to claim 1 wherein resilient means are disposed between said tines and the inner walls of said tubes to develop slight frictional constraint therebetween tending to prevent said tines from moving loosely within said tubes.

3. A rotary roasting fork according to claim 1 wherein said coupling means comprise an annular gear element carried by said handle element, and a plurality of gears mounted to said rearward extremities of said cables and meshed with said gear element.

4. A rotary roasting fork according to claim 1 wherein said plurality of tubes are arranged with their longitudinal axes extending outwardly in divergent relation to the longitudinal axis of said barrel whereby the outer extremities of said tines are generously spaced apart.

* * * * *